(12) United States Patent
Mitlitsky et al.

(10) Patent No.: US 7,168,465 B2
(45) Date of Patent: Jan. 30, 2007

(54) ELECTROCHEMICAL CELL SYSTEM, HYDROGEN DISPENSING APPARATUS, AND METHOD FOR DISPENSING HYDROGEN

(75) Inventors: Fred Mitlitsky, Livermore, CA (US); John F. Boyle, Emmaus, PA (US); Luke T. Dalton, Portland, CT (US); Blake Myers, Livermore, CA (US); Hassan Obahi, West Springfield, MA (US); Jason K. Shiepe, Middletown, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 489 days.

(21) Appl. No.: 10/248,480

(22) Filed: Jan. 22, 2003

(65) Prior Publication Data

US 2003/0148153 A1 Aug. 7, 2003

Related U.S. Application Data

(60) Provisional application No. 60/319,086, filed on Jan. 22, 2002.

(51) Int. Cl.
*B65B 1/04* (2006.01)

(52) U.S. Cl. ........................ 141/231; 141/94

(58) Field of Classification Search .............. 141/1, 141/2, 18, 67, 94, 95, 192, 198, 100, 231
See application file for complete search history.

(56) References Cited

U.S. PATENT DOCUMENTS

| | | | |
|---|---|---|---|
| 4,002,553 A | 1/1977 | Arntz | |
| 4,528,614 A | 7/1985 | Shariff et al. | |
| 4,625,627 A | 12/1986 | Livanos et al. | |
| 4,963,235 A | 10/1990 | Brattan et al. | ............ 204/98 |
| 5,138,522 A | 8/1992 | Kojima et al. | |
| 5,238,030 A * | 8/1993 | Miller et al. | ............ 141/4 |
| 5,365,981 A | 11/1994 | Peschka et al. | ............ 141/7 |
| 5,409,046 A | 4/1995 | Swenson et al. | |
| 5,542,459 A | 8/1996 | Price et al. | ............ 141/18 |

(Continued)

FOREIGN PATENT DOCUMENTS

FR 2773822 7/1999

(Continued)

OTHER PUBLICATIONS

Japanese Patent Application No.: JP 2001130901; Publication Date May 15, 2001; Abstract Only (1 page).

(Continued)

*Primary Examiner*—Steven O. Douglas
(74) *Attorney, Agent, or Firm*—Cantor Colburn LLP

(57) ABSTRACT

Disclosed herein are mobile hydrogen gas dispensing apparatus, and methods for dispensing hydrogen gas. In one embodiment, the mobile hydrogen gas dispensing apparatus comprises a first outlet and a second outlet. The first outlet comprises a first valve, a first hydrogen gas output port, a first nozzle, a first display panel in operable communication with the first hydrogen gas output port, and a first hose forming fluid communication between the first hydrogen output port and the first nozzle. The apparatus further comprises: an electrochemical cell disposed in fluid communication with the first outlet, and a mobile platform, wherein the first outlet and the electrochemical cell are mechanically connected to the mobile platform.

22 Claims, 5 Drawing Sheets

U.S. PATENT DOCUMENTS

| | | | |
|---|---|---|---|
| 5,771,946 A | 6/1998 | Kooy et al. | 141/82 |
| 5,779,866 A | 7/1998 | Tarancon | 204/262 |
| 5,800,258 A | 9/1998 | Knoop et al. | |
| 5,884,675 A | 3/1999 | Krasnov | |
| 5,913,344 A * | 6/1999 | Wronski et al. | 141/83 |
| 5,980,726 A | 11/1999 | Moulthrop, Jr. et al. | 205/637 |
| 5,983,962 A * | 11/1999 | Gerardot | 141/231 |
| 6,182,717 B1 | 2/2001 | Yamashita | |
| 6,432,283 B1 * | 8/2002 | Fairlie et al. | 204/230.2 |
| 6,468,412 B1 | 10/2002 | Bryan et al. | 205/500 |
| 6,745,801 B1 * | 6/2004 | Cohen et al. | 141/231 |
| 6,755,225 B1 * | 6/2004 | Niedwiecki et al. | 141/231 |
| 6,786,245 B1 * | 9/2004 | Eichelberger et al. | 141/4 |
| 6,810,925 B1 | 11/2004 | Graham et al. | |

FOREIGN PATENT DOCUMENTS

| | | |
|---|---|---|
| WO | WO 00/70262 | 11/2000 |

OTHER PUBLICATIONS

Japanese Patent Application No. JP 19930153144; Publication Date: Jan. 17, 1995; Abstract Only (1 page).

European Search Report; European Patent Application No.: 03001164.7-2119-; Dated: Aug. 14, 2003; 3 pages.

European Search Report; European Patent Application No.: 03001163.9-2119-; Dated: Jun. 11, 2003; 4 pages.

Kountz "Modeling the fast fill process in natural gas vehicle storage cylinders" Institute of Gas Technology pp. 462-469, no date.

Daney et al. "Hydrogen vehicle fueling station" Advances in Cryogenic Engineering, vol. 41, pp. 1041-1048, no date.

Mitlitsky "Regenerative Fuel Cell Systems R&D" Proceedings of the 1998 DOE Hydrogen Program Review, no date.

"Stuart energy systems—the hydrogen fuel company" www.power-technology.com/contractors/fuel/stuart/index.htm Jan. 11, 2002.

"Five years in the making, $18 million hydrogen procuction/fueling station opens in Munich" www.hfcletter.com/letter/june99/feature.html Jan. 11, 2002.

"Bus Fueler Ideal for buses and trucks" www.stuartenergy.com, no date.

"Station Components" www.stuartenergy.com/products/dp_stationcomponents.asp Jan. 11, 2002.

* cited by examiner

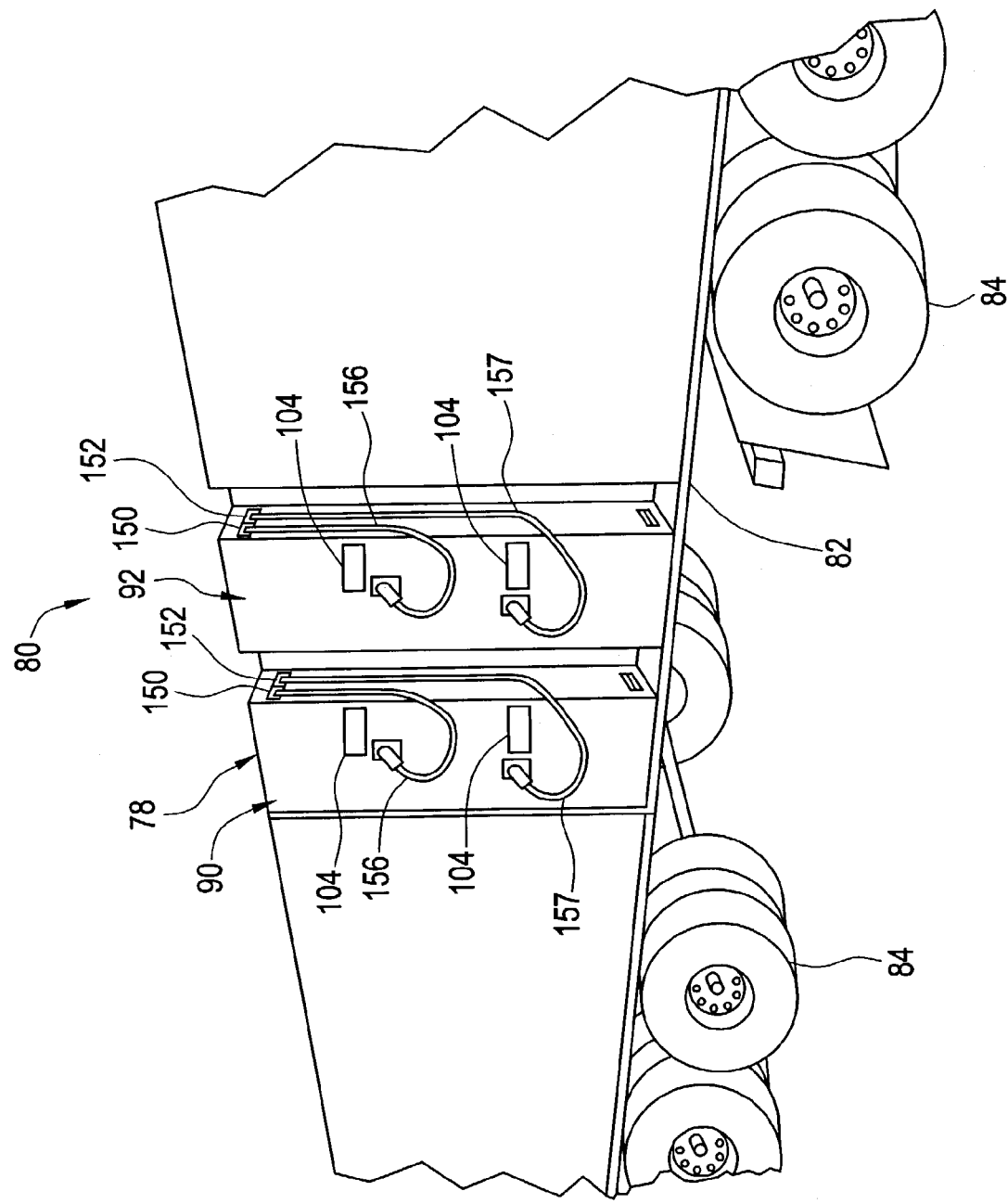

… …

ELECTROCHEMICAL CELL SYSTEM, HYDROGEN DISPENSING APPARATUS, AND METHOD FOR DISPENSING HYDROGEN

CROSS REFERENCE TO RELATED APPLICATIONS

This application claims priority to U.S. Provisional Patent Application No. 60/319,086 filed Jan. 22, 2002, which is incorporated herein by reference in its entirety.

BACKGROUND

This disclosure relates to electrochemical cells, and, more particularly, to a dispensing apparatus for an electrolysis cell.

Electrochemical cells are energy conversion devices, usually classified as either electrolysis cells or fuel cells. Proton exchange membrane electrolysis cells can function as hydrogen generators by electrolytically decomposing water to produce hydrogen and oxygen gases. Referring to FIG. 1, a section of an anode feed electrolysis cell of the prior art is shown generally at 10 and is hereinafter referred to as "cell 10." Reactant water 12 is fed into cell 10 at an oxygen electrode (anode) 14 to form oxygen gas 16, electrons, and hydrogen ions (protons) 15. The chemical reaction is facilitated by the positive terminal of a power source 18 connected to anode 14 and the negative terminal of power source 18 connected to a hydrogen electrode (cathode) 20. Oxygen gas 16 and a first portion 22 of water are discharged from cell 10, while the protons 15 and second portion 24 of the water migrate across a proton exchange membrane 26 to cathode 20. At cathode 20, hydrogen gas 28 is formed and removed, generally through a gas delivery line. Second portion 24 of water, which is entrained with hydrogen gas, is also removed from cathode 20.

An electrolysis cell system may include a number of individual cells arranged in a stack with reactant water being directed through the cells via input and output conduits formed within the stack structure. The cells within the stack are sequentially arranged, and each one includes a membrane electrode assembly defined by a proton exchange membrane disposed between a cathode and an anode. The cathode, anode, or both may be gas diffusion electrodes that facilitate gas diffusion to proton exchange membrane. Each membrane electrode assembly is in fluid communication with a flow field positioned adjacent to the membrane electrode assembly. The flow fields are defined by structures that facilitate fluid movement and membrane hydration within each individual cell.

The second portion of water, which is entrained with hydrogen gas, is discharged from the cathode side of the cell and is fed to a phase separation unit to separate the hydrogen gas from the water, thereby increasing the hydrogen gas yield and the overall efficiency of the cell in general. The removed hydrogen gas may be delivered directly to a hydrogen powered application for use as a fuel. Alternately, the removed hydrogen gas may be charged to a storage facility, e.g., a cylinder, a tank, or a similar type of containment vessel, for subsequent delivery to a hydrogen powered application.

Regardless of whether the hydrogen gas is delivered directly to the application or delivered from a storage facility, the gas is dispensed through a dispensing system. Oftentimes, however, the application to which the gas is dispensed is remote from the dispensing system, and the system lends itself to being stationary. While hydrogen powered automobiles may be brought to the dispensing system with little difficulty, larger and less easily movable applications (e.g., heavy machinery) may be impossible to move.

While existing electrolysis cell systems are suitable for their intended purposes, there still remains a need for improvements, particularly regarding the efficient dispensing of hydrogen gas to a hydrogen powered application to complete a refueling operation. Therefore, a need exists for a dispensing system that is capable of being moved to the particular application and effectively delivering the hydrogen gas generated by the cell system to the application.

SUMMARY

Disclosed herein are mobile hydrogen gas dispensing apparatus, and methods for dispensing hydrogen gas. In one embodiment, the mobile hydrogen gas dispensing apparatus comprises a first outlet and a second outlet. The first outlet comprises a first valve, a first hydrogen gas output port, a first nozzle, a first display panel in operable communication with the first hydrogen gas output port, and a first hose forming fluid communication between the first hydrogen output port and the first nozzle. The apparatus further comprises: an electrochemical cell disposed in fluid communication with the first outlet, and a mobile platform, wherein the first outlet and the electrochemical cell are mechanically connected to the mobile platform.

One embodiment of the method dispensing hydrogen gas comprises: selecting a hydrogen gas pressure using a pressure selector disposed in operable communication with a hydrogen gas output port, disposing a nozzle in fluid communication with a vessel to receive the hydrogen gas, dispensing hydrogen gas at the selected hydrogen gas pressure, ceasing a flow of hydrogen gas to the vessel; and removing the nozzle from fluid communication with the vessel, wherein the nozzle is in fluid communication with a flexible hose and the hydrogen gas output port to form a first outlet disposed in mechanical connection with a mobile platform.

The above described and other features are exemplified by the detailed description and accompanying drawings.

BRIEF DESCRIPTION OF THE DRAWINGS

Referring now to the Figures, which are exemplary embodiments, and wherein the like elements are numbered alike:

FIG. 4 is a perspective view of a hydrogen dispensing apparatus mounted on a truck bed.

DETAILED DESCRIPTION

The terms "first, second, third," etc. used herein are merely intended to distinguish between elements of the system and are not intended to denote any ordering or sequence.

Figure 2:
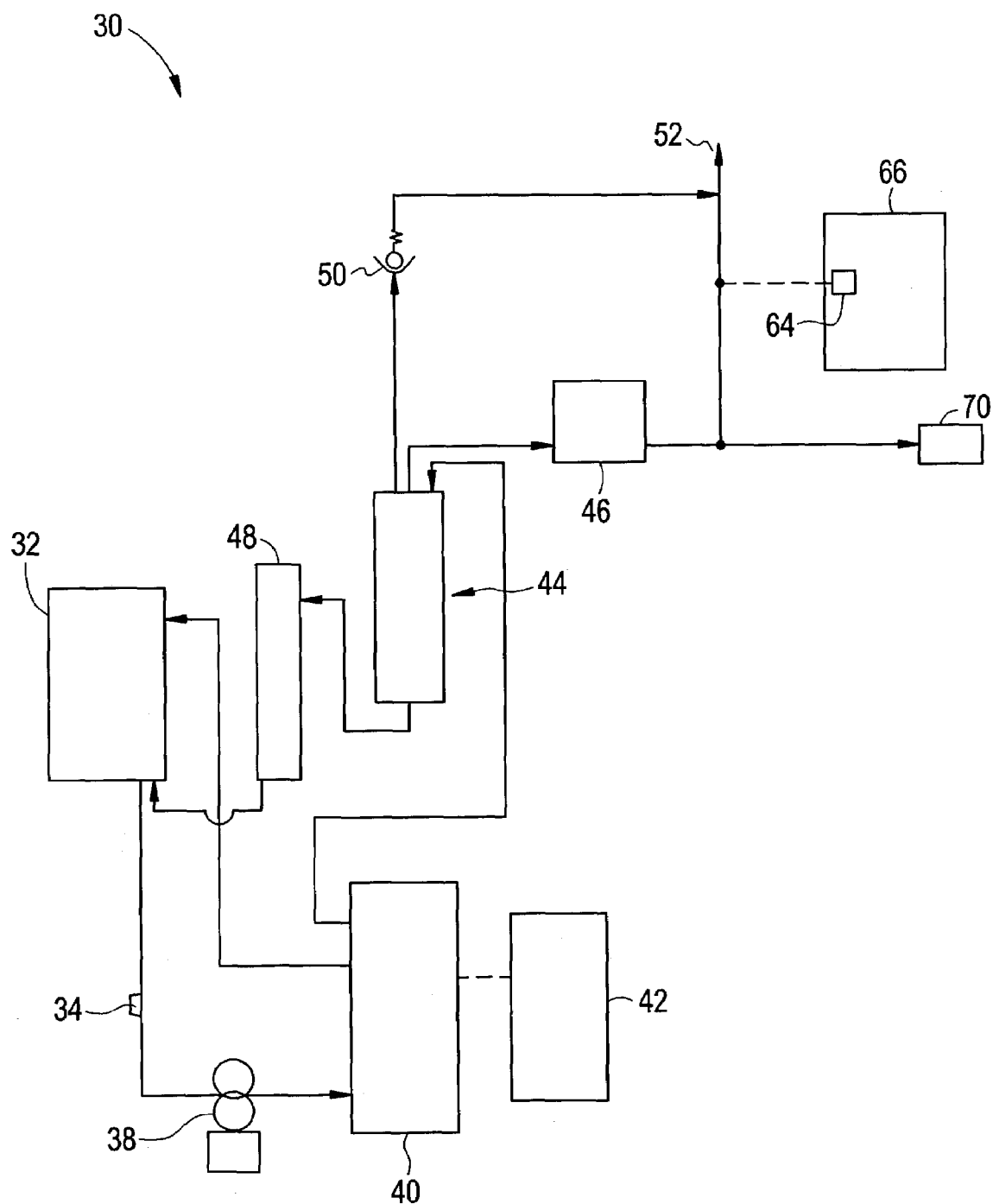
FIG. 2 is a schematic representation of an electrolysis cell system in which hydrogen gas can be generated.

Referring to FIG. 2, an exemplary embodiment of a hydrogen gas source is an electrolysis cell system, which is shown generally at 30 and is hereinafter referred to as "system 30." System 30 may be generally suitable for generating hydrogen for use in gas chromatography, as a fuel, and for various other applications. While the inventive improvements described below are described in relation to an electrolysis cell, the improvements are applicable to both electrolysis and fuel cells. Furthermore, although the description and figures are directed to the production of hydrogen and oxygen gas by the electrolysis of water, the apparatus is applicable to the generation of other gases from other reactant materials.

System 30 includes a water-fed electrolysis cell capable of generating hydrogen gas from reactant water. The reactant water utilized by system 30 is stored in a water source 32 and is fed by gravity or pumped through a pump 38 into an electrolysis cell stack 40. The supply line preferably includes an electrical conductivity sensor 34 disposed therewithin to monitor the electrical potential of the water, thereby determining its purity and ensuring its adequacy for use in system 30.

Figure 1:
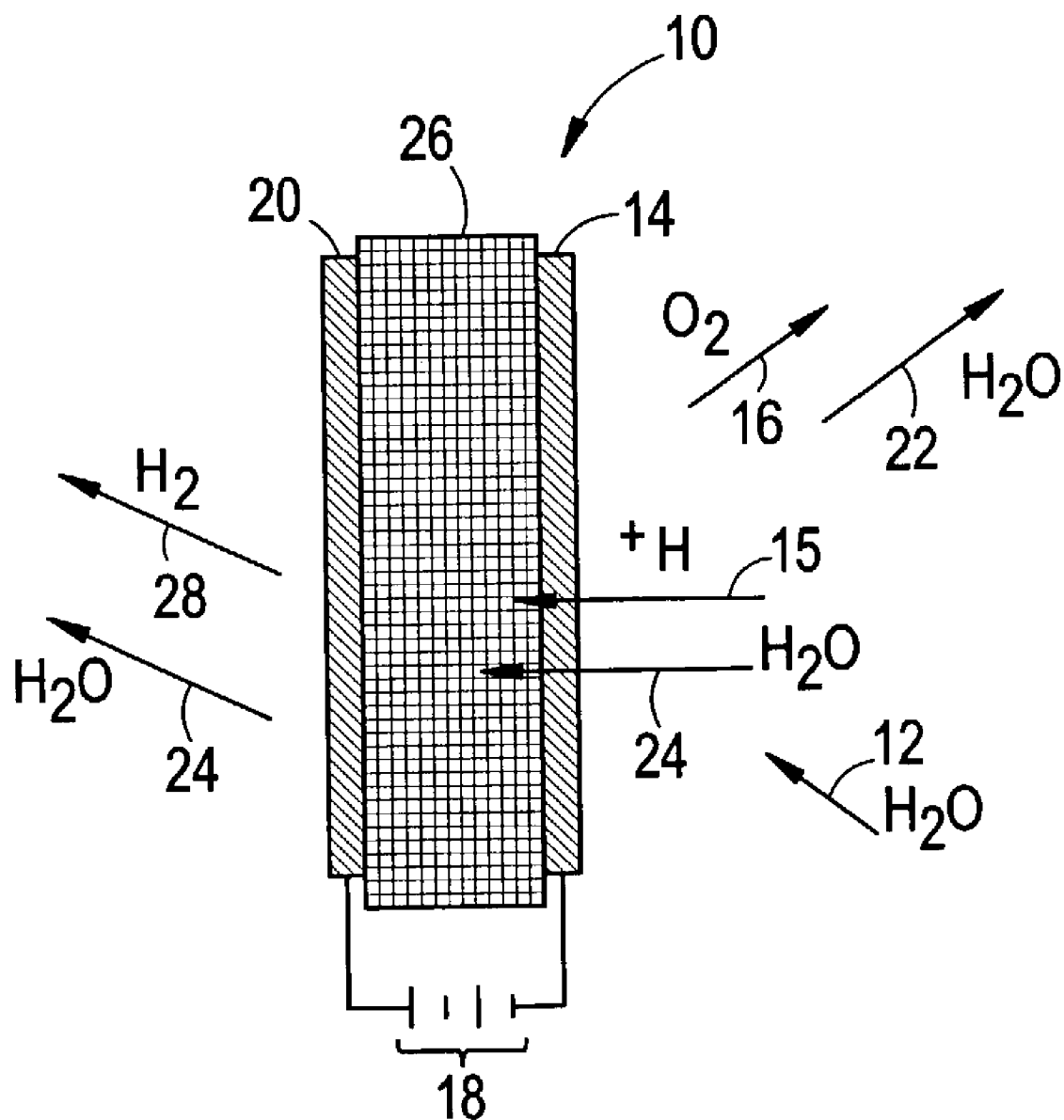
FIG. 1 is a schematic representation of an anode feed electrolysis cell of the prior art.

Cell stack 40 comprises a plurality of cells, e.g., similar to cell 10 described above with reference to FIG. 1, that are encapsulated within sealed structures (not shown). The reactant water is received by manifolds or other types of conduits (not shown) that are in fluid communication with the cell components. An electrical source 42 is disposed in electrical communication with each cell within cell stack 40 to provide a driving force for the dissociation of the water. Electrical source 42 is operatively communicable with a cell control system (not shown) that controls the operation of system 30.

Oxygen and water exit cell stack 40 via a common stream that recycles the oxygen and water to water source 32 where the oxygen is vented to the atmosphere. The hydrogen stream, which is entrained with water, exits cell stack 40 and is fed to a gas/liquid separator or phase separation tank, which is a hydrogen/water separation apparatus 44, hereinafter referred to as "separator 44," where the gas and liquid phases are separated. The exiting hydrogen gas (having a lower water content than the hydrogen stream to separator 44) can be further dried at a drying unit 46, which may be, for example, a diffuser, a pressure swing absorber, desiccant, or the like. This wet hydrogen stream can have a pressure of about 1 pounds per square inch (psi) up to and exceeding about 20,000 psi. Preferably the hydrogen stream pressure is about 1 psi to about 10,000 psi with a pressure of about 1,500 psi to about 2,500 psi more preferred for some applications, and a pressure of about 100 psi to about 275 psi more preferred for other applications.

Water with trace amounts of entrained hydrogen is returned to water source 32 from separator 44 through an optional low-pressure hydrogen separator 48. Low pressure hydrogen separator 48 allows hydrogen to escape from the water stream due to the reduced pressure, and also recycles water to water source 32 at a lower pressure than the water exiting separator 44. Separator 44 also includes a release 50, which may be a relief valve, to rapidly purge hydrogen to a hydrogen vent 52 when the pressure or pressure differential exceeds a pre-selected limit.

Pure hydrogen from drying unit 46 is fed to a refueling system 70 disposed in fluid communication with cell stack. Refueling system 70 is a fluid distribution system that allows for the transfer of hydrogen gas produced by system 30 to the application site. Refueling system 70 may be remotely located with respect to system 30, or it may be disposed directly at system 30. A dispensing apparatus (shown below with reference to FIGS. 3 through 5) is maintained in fluid communication with refueling system 70 to deliver the hydrogen gas to the application.

A hydrogen output sensor 64 can be incorporated into system 30 to monitor the hydrogen pressure. Hydrogen output sensor 64 can be any suitable output sensor including, but not limited to, a flow rate sensor, a mass flow sensor, or any other quantitative sensing device such as a pressure transducer that converts the gas pressure within the hydrogen line to a voltage or current value for measurement. Hydrogen output sensor 64 is interfaced with a transmitter 66, which is capable of converting the voltage or current value into a pressure reading. A display (not shown) may be disposed in operable communication with transmitter 66 to provide a reading of the pressure, for example, at the location of hydrogen output sensor 64 on the hydrogen line. Transmitter 66 is any suitable converting device, such as an analog circuit, a digital microprocessor, or the like, capable of converting a sensor signal into a displayable value.

Figure 3:
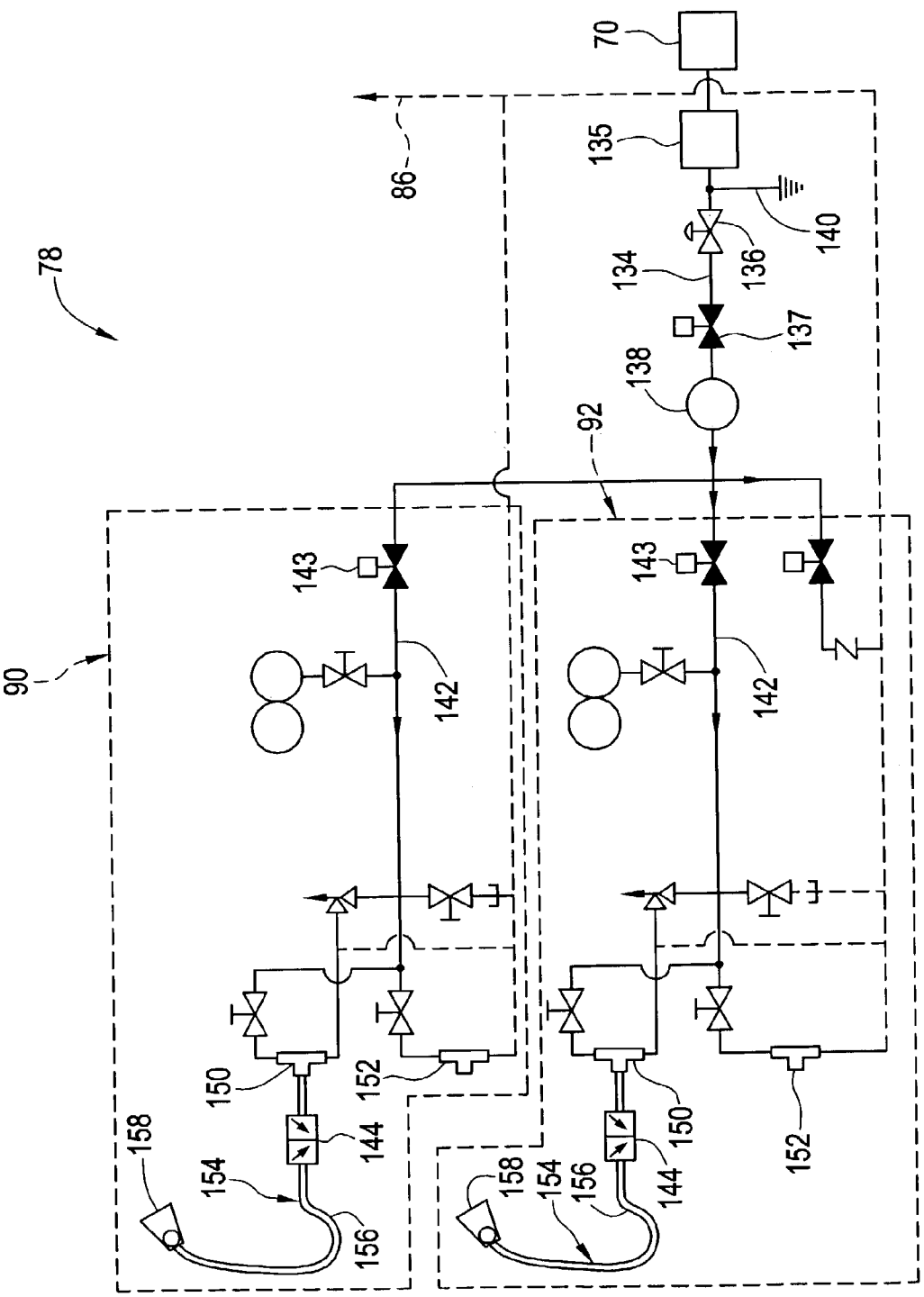
FIG. 3 is a schematic representation of a hydrogen dispensing apparatus.

As stated above, the dispensing apparatus is disposed in fluid communication with the electrolysis cell system through refueling system 70. The electrolysis cell system, refueling system 70, and the dispensing apparatus are mounted so as to be mobile, thereby enabling the hydrogen source to be brought to the particular hydrogen-powered application. Referring now to FIG. 3, one exemplary embodiment of a dispensing apparatus is shown schematically at 78. Dispensing apparatus 78 includes a first outlet 90 and a second outlet 92 both disposed in fluid communication with refueling system 70 through an inlet line 134. Inlet line 134 extending from refueling system 70 can include a filter 135, a pressure control valve 136 to regulate the flow of hydrogen gas from refueling system 70, an actuatable valve 137 responsive to either operator input or sensed system parameters (e.g., upstream pressures, flow rates, and the like) to allow fluid communication between refueling system 70 and outlets 90, 92, and a flow meter 138 to monitor the flow to outlets 90, 92. Inlet line 134 may further be flexible in order to allow outlets 90, 92 to be moved relative to refueling system 70. A grounding device (e.g., a rod, line, or the like) 140 can be disposed in mechanical and, when in operation, electrical communication with inlet line 134 and is preferably inserted into the ground at a depth sufficient to enable an electrical ground (e.g., a distance of about eight feet or so). A hydrogen vent 86 is disposed in fluid communication with each outlet 90, 92 to enable excess pressure within the system to be vented to the atmosphere.

Each outlet 90, 92 is defined by a line 142 that can include an actuatable valve 143 controllable in response to sensed system parameters. Each line 142 preferably includes an upper product output port 150 and a lower product output port 152 from which hydrogen gas may be dispensed. Upper nozzle assemblies 154 are attached to each upper product output port 150. Lower nozzle assemblies are similarly attached to each lower product output port 152. Each nozzle assembly preferably comprises a breakaway coupling 144 disposed at its respective output port, a flexible hose 156 depending from breakaway coupling 144, and a nozzle 158 disposed at flexible hose 156. Breakaway couplings 144 are readily separable from their associated product outlet ports 150, 152 in the event that a predetermined amount of force is applied at the associated nozzle assembly 154.

First outlet 90 delivers hydrogen gas at a first pressure through its associated product outlet ports 150, 152, and second outlet 92 delivers hydrogen gas at a second pressure through its associated product outlet ports 150, 152. The differing pressures at which outlets 90, 92 deliver hydrogen gas are generally suited for hydrogen-powered automobile applications. Other applications for which the hydrogen gas may be used include, but are not limited to, heavy machinery, aircraft, and marine applications. First outlet 90 is preferably suited to deliver hydrogen gas at pressures of less than or equal to about 4,500 psi (e.g., at pressures of about 2,700 psi to about 4,500 psi, and more preferably at about 3,600 psi). Second outlet 92 is preferably suited to deliver hydrogen gas at pressures exceeding about 3,500 psi, e.g., at about 3,700 psi to about 6,750 psi, and more preferably at about 4,600 psi to about 6,750 psi, with about 5,000 psi more preferred. Outlets 90, 92 are configured such that they can simultaneously deliver hydrogen gas, e.g., to two vehicles, tanks, or the like. Further, one or more of the outlets can optimally comprise a pressure selector such that an operator (e.g., person, computer, or other controller) can select a desired fill pressure for dispensing the hydrogen gas (e.g., a pressure to which the vessel will be filled). For example, one operator can select a pressure of 3,750 psi and dispense hydrogen gas to fill a tank to a pressure of 3,750 psi, while a subsequent operator can select a pressure of 5,000 psi, at the same outlet, and dispense hydrogen gas to fill a vessel to a pressure of 5,000 psi. The limits upon the pressures to which a vessel can be filled from the mobile dispenser are merely based upon equipment specifications. Filling of vessels to pressures of up to and exceeding about 20,000 psi are envisioned.

Referring now to FIG. 4, one exemplary embodiment of a vehicle by which dispensing apparatus 78 can be made mobile is shown at 80. Vehicle 80 comprises a platform 82 on which dispensing apparatus 78 and, optionally, the refueling system are mounted. Platform 82 may be a truck bed or other type of wheeled structure, as is shown, or any type of carriage mechanism including, but not limited to, tracked platforms, railed platforms, floating platforms, and the like, as well as combinations comprising at least one of the foregoing mechanisms. Dispensing apparatus 78 is preferably positioned between opposing ends of platform 82 such that wheels 84 positioned at each end sufficiently support the weight of dispensing apparatus 78. Outlets 90, 92 are generally positioned adjacent to each other and side-by-side on platform 82.

Flexible hoses disposed at lower product output ports 152, shown at 157, are generally of lengths such that their associated nozzles can be accessed by an operator standing at ground level when dispensing apparatus 78 is positioned at platform 82. Flexible hoses 156 depending from upper product output ports 150 are substantially shorter, thereby rendering their associated nozzles 158 virtually inaccessible by an operator standing at ground level. Short hoses are preferred to minimize complexity of the apparatus and to avoid possible hose damage due to hitting the ground. Optionally, the outlets 90 and/or 92 can comprise a movable panel (e.g., sliding, flipping, and the like, e.g., vertically actuatable) and/or the outlets themselves can be on a movable portion of the dispensing apparatus 78 that enables the height of the nozzle and/or controls to be adjusted. The height can thereby be adjusted for facile operator accessibility. As stated above, although the hydrogen gas dispensed from first outlet 90 is preferably at about 3,600 psi and the hydrogen gas dispensed from second outlet 92 is preferably at about 5,000 psi in accordance with current hydrogen use standards, other pressures can be attained by adjusting the pressure of the storage vessels and/or via the use of various pressure adjusting (increasing and/or decreasing) devices (such as compressors, and the like). For example, the nozzles can be designed to dispense gas at a range of pressures based upon operator input, a sensed signal, or the like.

Interface units 104 are disposed at the front face of each outlet 90, 92 such that the dispensing of hydrogen gas can be monitored and/or controlled by the operator. Interface units 104 are positioned at the front face of each outlet 90, 92, such that monitoring and/or control is easily facilitated. In particular, interface units 104 may include meters that supply the operator with information pertaining to the volumes of hydrogen gas dispensed. Interface units 104 may also include transactional apparatuses, e.g., card-swiping apparatuses that enable the operator to pay for hydrogen gas to be dispensed, and display screens that supply the operator with information pertaining to the specific transaction.

Dispensing apparatus 90, 92 may be mounted at platform 82 such that an operator at ground level can access upper nozzle assemblies 156. To make the upper nozzle assemblies accessible, dispensing apparatus 78 may be lowered. Each half of dispensing apparatus 78 (i.e., first outlet 90 and/or second outlet 92) may, furthermore, be lowered independently of the other, or both may be lowered together. Lowering of dispensing apparatus 78 as a unit or either outlet 90, 92 may be affected via a counterweight assembly, shown at 108 with reference to FIGS. 5A and 5B, or the like.

Counterweight assembly 108 includes a counterweight 110 disposed in mechanical communication with apparatus 78 through a pulley/cable arrangement 112. Pulley/cable arrangement 112 may include any arrangement of pulleys 114 (e.g., block and tackle arrangements) that enable dispensing apparatus 78 (or either outlet individually) to be lowered and raised by an operator, manually or automatically. Counterweight 110 is preferably mounted on a track assembly (not shown) that allows counterweight 110 to translate vertically without significant sway in horizontal directions. The outlets are likewise mounted on similar track assemblies (not shown).

Figure 5A:
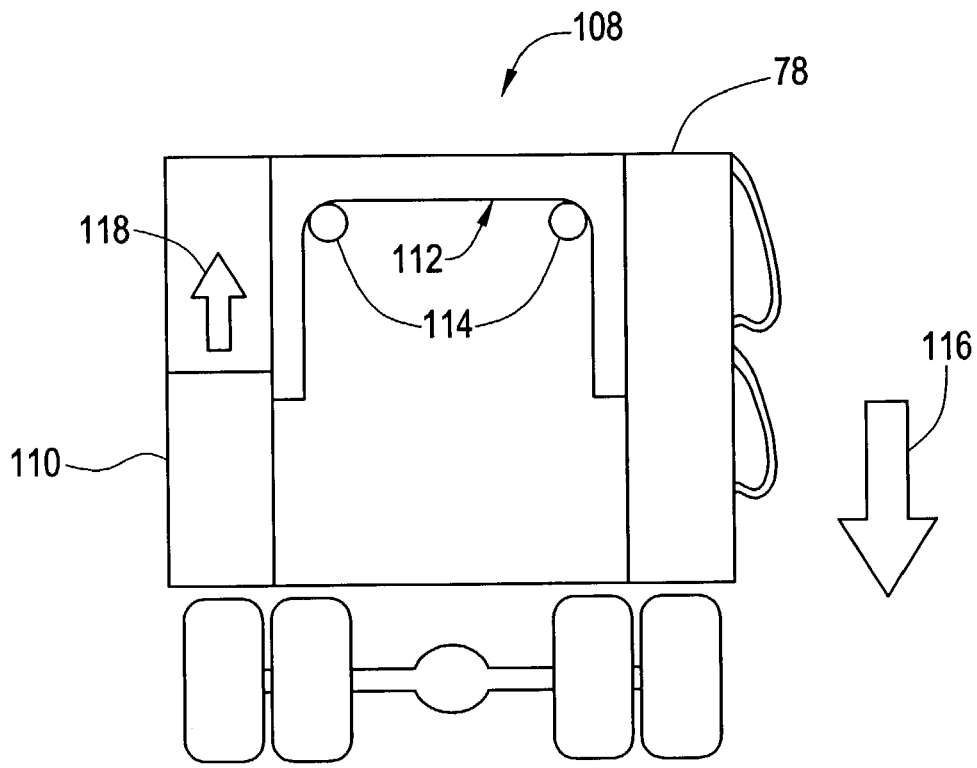
FIGS. 5A and 5B are rear sectional views of a truck bed having a hydrogen dispensing apparatus disposed at bed level and at ground level.
Figure 5B:
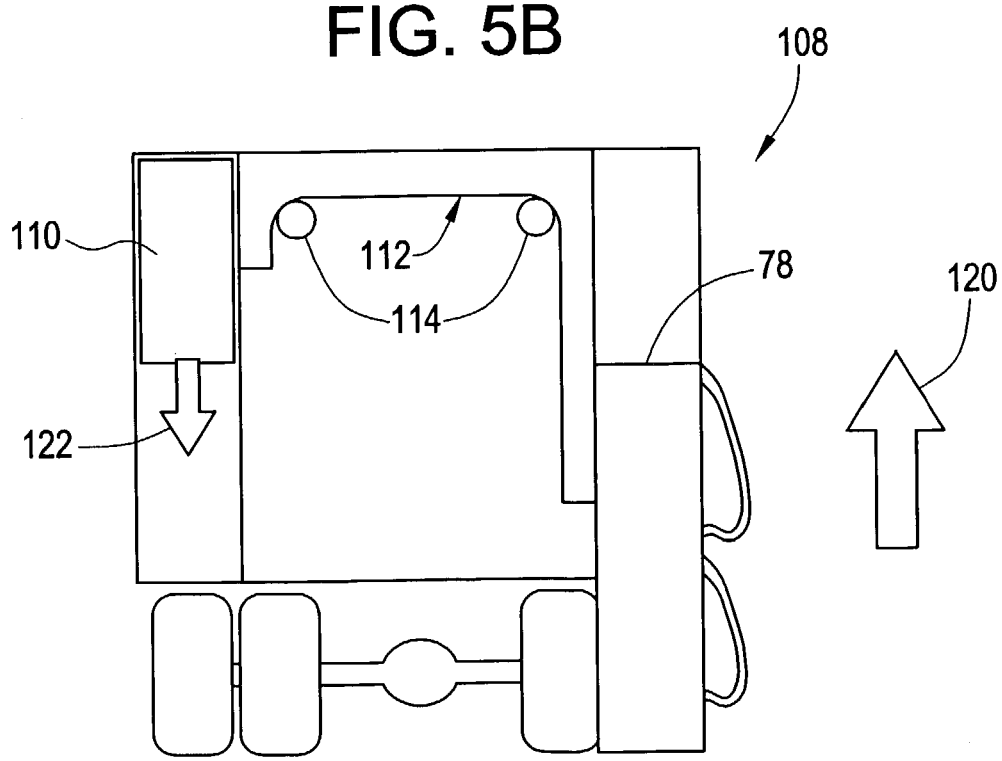

As can be seen in FIG. 5A, upon articulation of dispensing apparatus 78 in the direction indicated by an arrow 116, counterweight 110 translates in the direction indicated by an arrow 118. Once dispensing apparatus 78 is lowered, counterweight 110 is disposed proximate an upper end of the track on which it slides, as can be seen in FIG. 5B. Automatic braking mechanisms (not shown) retain dispensing apparatus 78 at ground level and counterweight 110 at the elevated level until the operator articulates dispensing apparatus 78 in the direction of an arrow 120, thereby causing counterweight 110 to translate in the direction of an arrow 122.

In operation, an operator (e.g., a consumer) activates the dispenser (e.g., by swiping a card, removing the nozzle from the nozzle holder, entering a code, and/or pushing a button, or the like). An electrical connection is optionally made to the unit to be fueled (e.g., a vehicle, tank, or the like), and the appropriate dispensing nozzle is disposed in fluid communication with the vessel to be fueled (e.g., a lever is used to mechanically engage the connector to a fill tube with similar rating). Optionally the operator may make a pressure selection on the dispensing unit to define the pressure fill desired. Various sensors (e.g., pressure, temperature, and the like) within the system monitor and/or control the fueling process to ensure the fueling meets the appropriate codes and standards. When the criteria for initiation of fueling have been met (e.g., the sensors signal ready), the appropriate methodology of filling initiates (e.g., fast or slow filling to the desired pressure). Hydrogen is delivered to the tank by positive pressure differential between the dispenser and the tank. Filling will continue until a pre-set pressure level is achieved, or until one of several other thresholds has been triggered (e.g., maximum selected temperature reached, preset mass transfer has occurred, maximum dollar amount of hydrogen has been reached, or another sensor signal initiates a halt in the filling process). The operator will then disengage the applicable connections (e.g., mechanical and/or electrical connections) and return the nozzle to the dispenser.

The hydrogen dispensing apparatus described herein can be employed in conjunction with any type of electrochemical cell system (e.g., it can receive hydrogen from an electrolysis cell system that is in fluid communication with the dispensing apparatus 78 and co-located on the vehicle 80 or located remotely). The hydrogen from the dispensing apparatus can be employed to fuel any hydrogen consuming device, e.g., fuel cells (such as proton exchange membrane fuel cells, solid oxide fuel cells (SOFC), phosphoric acid fuel cells (PAFC), and the like) employed in various applications including vehicles, residential/commercial power supply units (primary and back-up, and the like).

Mobility of the apparatus provides additional advantages over stationary hydrogen dispensing systems, inasmuch as the mounting of the hydrogen dispensing apparatus to a movable platform renders the apparatus capable of being easily moved to accommodate the demands of substantially stationary hydrogen applications. Some possible stationary applications range from construction sites, buildings, and the like, to mobile vehicle fueling stations (e.g., a mobile hydrogen dispensing unit can be located at a fueling station and, when the amount of stored hydrogen decreases below a selected level, the dispensing unit can be replaced with another mobile hydrogen dispensing unit). Alternatively, since the hydrogen dispensing apparatus is designed to allow connection to an auxiliary storage unit (e.g., a tube trailer), when the auxiliary storage is depleted, it can be replaced with a different auxiliary storage unit that contains hydrogen. In yet another alternative embodiment, the auxiliary storage unit might be filled by the dispensing apparatus. The full auxiliary storage unit might be delivered to a customer and replaced with a depleted auxiliary storage unit for subsequent filling.

The dispensing apparatus can alternatively comprise: a first outlet configured to dispense said hydrogen gas at a first pressure; and a second outlet configured to dispense said hydrogen gas at a second pressure, said second outlet being in fluid communication with said first outlet through an inlet line, said inlet line being disposed in fluid communication with a hydrogen source. Optionally, the first outlet and said second outlet can each comprise, a line, a first product output port disposed in fluid communication with the line, a second product output port disposed in fluid communication with said line, a first nozzle assembly disposed in fluid communication with said first product output port, and a second nozzle assembly disposed in fluid communication with said second product output port. The first nozzle assembly and the second nozzle assembly can each optionally comprise, a breakaway coupling, a flexible hose disposed in operable communication with said breakaway coupling, and a nozzle disposed in operable communication with said flexible hose. Additionally, the dispensing apparatus can further comprise a grounding device disposed in electrical communication with said inlet line, a wheeled structure, wherein said dispensing apparatus is mounted on said wheeled structure, an interface unit disposed proximate said first outlet, or a counterweight/pulley assembly to affect the translation of said dispensing apparatus in a vertical direction, as well as combinations comprising at least one of the foregoing additional features.

One method for dispensing hydrogen gas can comprise; activating the hydrogen dispenser, wherein said dispenser comprises an inlet line in fluid communication with a hydrogen source, said inlet line optionally comprising a filter, a pressure control valve, an actuatable valve, and/or a flow meter; a first outlet disposed in fluid communication with said inlet line, said first outlet comprising an actuatable valve, a first product output port, a second product output port, a first breakaway coupling disposed at each of said output ports, a first flexible hose disposed at each of said breakaway couplings, and a first nozzle disposed at each of said flexible hoses; a second outlet disposed in fluid communication with said inlet line, said second outlet comprising an actuatable valve, a third product output port, a fourth product output port, a second breakaway coupling disposed at each of said output ports, a second flexible hose disposed at each of said breakaway couplings, and a second nozzle disposed at each of said flexible hoses; an electrical grounding device disposed in mechanical communication with said inlet line; and a mobile platform, wherein said dispensing apparatus is supported on said mobile platform; mechanically connecting at least one of said first nozzles or said second nozzles to a hydrogen unit; dispensing hydrogen to said hydrogen unit; and ceasing hydrogen flow to said hydrogen unit. Optionally, as the hydrogen is dispensed (either at the storage vessel (cylinder, or the like) or as the hydrogen enters the outlet line(s)), it can be cooled. Preferably the hydrogen is cooled to non cryogenic temperatures.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A mobile hydrogen gas dispensing apparatus, comprising:
    a first outlet comprising a first valve, a first hydrogen gas output port, a first nozzle, a first display panel in operable communication with the first hydrogen gas output port, and a first hose forming fluid communication between the first hydrogen output port and the first nozzle;
    an electrochemical cell disposed in fluid communication with the first outlet;
    a mobile platform, wherein the first outlet and the electrochemical cell are mechanically connected to the mobile platform.

2. The mobile hydrogen gas dispensing apparatus of claim 1, further comprising a second outlet comprising a second valve, a second hydrogen gas output port, a second nozzle, a second display panel disposed in operable communication with the second hydrogen gas output port, and a second hose forming fluid communication between the second hydrogen gas output port and the second nozzle, wherein the second outlet is mechanically connected to the mobile platform.

3. The mobile hydrogen gas dispensing apparatus of claim 2, wherein the first outlet further comprises a first breakaway coupling connecting the first hose to the first hydrogen gas output port, and wherein the second outlet further comprises a second breakaway coupling connecting the second hose to the second hydrogen gas output port.

4. The mobile hydrogen gas dispensing apparatus of claim 2, wherein the first outlet and the second outlet are configured to dispense hydrogen gas simultaneously.

5. The mobile hydrogen gas dispensing apparatus of claim 4, wherein the first outlet and the second outlet are configured to dispense hydrogen gas at different fill pressures.

6. The mobile hydrogen gas dispensing apparatus of claim 1, wherein at least one of the first valve and the second valve are actuatable valves.

7. The mobile hydrogen gas dispensing apparatus of claim 1, further comprising an electrical ground in mechanical contact with at least one of the first outlet, the electrolysis cell, the mobile platform, and connections therebetween.

8. The mobile hydrogen gas dispensing apparatus of claim 1, wherein the first outlet is further disposed in fluid communication with a hydrogen gas vent.

9. The mobile hydrogen gas dispensing apparatus of claim 1, wherein the first outlet further comprises a third hydrogen gas output port, and a third nozzle with a third hose forming fluid communication between the third hydrogen gas output port and the third nozzle.

10. The mobile hydrogen gas dispensing apparatus of claim 9, wherein the first outlet further comprises a first breakaway coupling connecting the first hose to the first hydrogen gas output port, and a third breakaway coupling connecting the third hose to the third hydrogen gas output port.

11. The mobile hydrogen gas dispensing apparatus of claim 9, wherein the first hydrogen gas output port and the third hydrogen gas output port are configured to dispense hydrogen gas at different fill pressures.

12. The mobile hydrogen gas dispensing apparatus of claim 11, wherein the first hydrogen gas output port fill pressure is about 2,700 psi to about 4,500 psi, and wherein the third hydrogen gas output port fill pressure is about 3,700 psi to about 6,750 psi.

13. The mobile hydrogen gas dispensing apparatus of claim 1, wherein the first outlet further comprises a pressure selector in operable communication with the first hydrogen gas output port and configured to adjust a hydrogen gas fill pressure to a selected pressure input into a pressure selector by an operator.

14. The mobile hydrogen gas dispensing apparatus of claim 1, wherein the first outlet is configured to dispense hydrogen gas to a vehicle.

15. The mobile hydrogen gas dispensing apparatus of claim 1, wherein the first outlet is vertically actuatable.

16. The mobile hydrogen gas dispensing apparatus of claim 15, wherein the first outlet comprises a movable panel capable of at least one of sliding and flipping.

17. The mobile hydrogen gas dispensing apparatus of claim 1, wherein the mobile platform is a truck.

18. The mobile hydrogen gas dispensing apparatus of claim 1, wherein the first outlet is configured to dispense hydrogen gas to a fuel cell system.

19. The mobile hydrogen gas dispensing apparatus of claim 2, wherein the first outlet and the second outlet are configured to dispense hydrogen gas at different fill pressures.

20. A mobile hydrogen gas dispensing apparatus, comprising:
   a first outlet comprising a first valve, a first hydrogen gas output port, a first nozzle, a first display panel in operable communication with the first hydrogen gas output port, and a first hose forming fluid communication between the first hydrogen output port and the first nozzle;
   a second outlet comprising a second valve, a second hydrogen gas output port, a second nozzle, a second display panel in operable communication with the second hydrogen gas output port, and a second hose forming fluid communication between the second hydrogen gas output port and the second nozzle,
   an electrolysis cell disposed in fluid communication with the first outlet and the second outlet;
   a mobile platform, wherein the first outlet, second outlet, and the electrochemical cell are mechanically connected to the mobile platform.

21. The mobile hydrogen gas dispensing apparatus of claim 20, further comprising a transactional apparatus configured to enable payment for the hydrogen gas.

22. The mobile hydrogen gas dispensing apparatus of claim 1, further comprising a transactional apparatus configured to enable payment for the hydrogen gas.

* * * * *